United States Patent [19]
Flocchini

[11] Patent Number: 5,855,183
[45] Date of Patent: Jan. 5, 1999

[54] TEAT CUP ASSEMBLY

[76] Inventor: Andrew J. Flocchini, 7078 Lakeview Hwy., Petaluma, Calif. 94952

[21] Appl. No.: 965,593

[22] Filed: Nov. 6, 1997

[51] Int. Cl.[6] ........................................... A01J 5/00
[52] U.S. Cl. ............................................. 119/14.54
[58] Field of Search ................................ 119/14.54, 14.55

[56] References Cited

U.S. PATENT DOCUMENTS

| | | | |
|---|---|---|---|
| 3,094,099 | 6/1963 | Bertao | 119/14.54 |
| 3,125,067 | 3/1964 | Fosnes | 119/14.55 |
| 3,388,689 | 6/1968 | Patrick | 119/14.13 |
| 3,999,516 | 12/1976 | Shulick | 119/14.1 |

*Primary Examiner*—Robert P. Swiatek
*Assistant Examiner*—James S. Bergin
*Attorney, Agent, or Firm*—Townsend and Townsend and Crew, LLP

[57] ABSTRACT

A teat cup assembly for evenly distributing its weight to the udder of dairy animal despite variations and changes in teat angularity and elevation. The teat cup assembly has four teat cups, two on each side. The two teat cups on each side communicate to a side manifold; preferably a rounded and separately enclosed manifold having an outlet and two inlets, one for each teat cup. The two inlets are canted fore and rear for leading teat cup milk receiving lines to the bottom of the teat cups. The two enclosed manifolds have two degrees of motion with respect to one another. In a first degree of motion, the enclosed manifolds hinge towards and away from one another preferably at a hinge extending between the bottom rear of the manifold. This first degree of motion is restricted in opening by a keeper to enable convenient handling of the teat cup assembly as a unit. In a second degree of motion, the two manifolds relatively rotate with respect to one another. Both the first and second degree of movement combine to provide even weight distribution through the teats to the bag of a dairy animal to enable minimal strain on the animal during milking.

2 Claims, 1 Drawing Sheet

TEAT CUP ASSEMBLY

This invention relates to teat cup assemblies commonly used in milking dairy animals such as cows. Specifically, a simplified manifold arrangement is disclosed for fastening to the four teats of a cows bag or udder. The simplified manifold enables the teat cup assembly to accommodate uneven and changing angularities and elevations between the individual teats while producing even weight distribution of the teat cup assembly to the animal during milking.

BACKGROUND OF THE INVENTION

The teats protruding from the udder or bag of a dairy animal such as a cow can be uneven in both elevation and angle. First, it is known that immediately prior to milking when the bag is full, the teats typically protrude with a normal angularity to the surface of the udder or bag. As milking proceeds, this angularity changes—typically angularly downward toward the vertical—as the bag empties of milk.

Furthermore, with individual dairy animals, teat angularity and elevation varies from animal to animal. This variation can depend on the overall size of the animal's bag, the age of the animal, the animals breed and heredity, and countless other factors.

Complicating the uneven and varying angularity of the teats is the need to suspend the weight of the teat cup assembly from the teats of the cow. Where one teat carries more weight of the teat cup assembly than the remain teats, several deleterious effects can follow. Since the teat cup assembly is supported from the individual teats, given a rigid teat cup assembly, the higher teat supports a disproportionate amount of the weight. This can strain or irritate the teat, leading to a loss of production.

Worse, such uneven teat cup distribution can lead to teat cup "squawking." Simply stated, the vacuum apparatus grasping the teat leaks across the flesh of the teat to atmosphere making an audible sound. As this noise is accompanied by teat irritation, the dairy operator must make immediate adjustment.

The problem of adjusting to varying teat angularity and elevation has been addressed in the prior art. See Bertao, U.S. Pat. No. 3,094,099. In this device, the weight of a teat cup assembly is supported by a strap from the cow or by a mechanical arm from the side of the milking stall. Each teat cup assembly is free to move on an independent path up and down relative to the teats and bag of a cow. This device thus requires auxiliary support, independent suspension and manifolding for each teat, and does not make accommodation for varying angularity of the teats, either as a result of the biological variation of the dairy animal or the fullness of the udder.

SUMMARY OF THE INVENTION

A teat cup assembly for evenly distributing its weight to the udder of dairy animal despite variations and changes in teat angularity and elevation. The teat cup assembly has four teat cups, two on each side. The two teat cups on each side communicate to a side manifold; preferably a rounded and separately enclosed manifold having an outlet and two inlets, one for each teat cup. The two inlets are canted fore and rear for leading teat cup milk receiving lines to the bottom of the teat cups. The two enclosed manifolds have two degrees of motion with respect to one another. In a first degree of motion, the enclosed manifolds hinge towards and away from one another preferably at a hinge extending between the bottom rear of the manifold. This first degree of motion is restricted in opening by a keeper to enable convenient handling of the teat cup assembly as a unit. In a second degree of motion, the two manifold relatively rotate with respect to one another. Both the first and second degree of movement combine to provide even weight distribution through the teats to the bag of a dairy animal to enable minimal strain on the animal during milking.

DESCRIPTION OF THE PREFERRED EMBODIMENT

Figure 1:
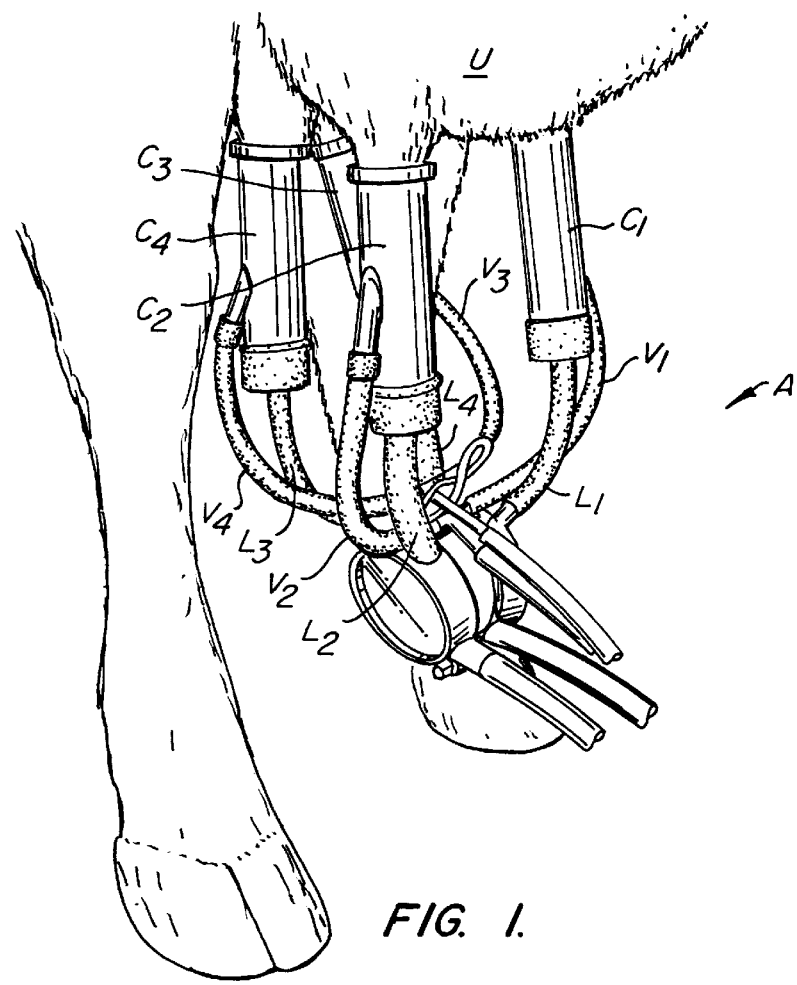
FIG. 1 is a perspective view of the improved teat cup assembly of this invention installed to the bag of a cow; and, FIG. 2 is a perspective view similar to FIG. 1 showing only the manifold portions of the teat cup assembly illustrating the two degrees of movement of the manifold.

Referring to FIG. 1, teat cup assembly A is illustrated having four teat cups C1–C4 attached thereto. The four teat cups C1–C4 are conventional; nothing further to describe the cups will be said other that to note the cups are served by vacuum lines V1–V4 and each cup has its own discrete milk discharge line L1–L4 for respective four teat cups C1–C4.

Figure 2:
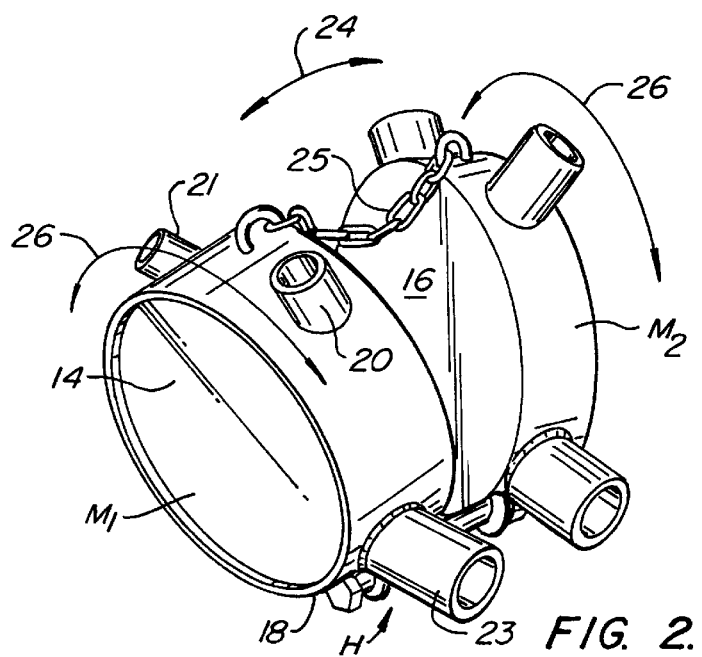

Referring to FIG. 2, respective milk receiving manifold sections M1–M2 are illustrated. As here shown, these respective sections are identical and placed in side-by-side relation with circular glass side 14, circular back side 16, and cylindrical surround 18.

Cylindrical surround 18 is provided with milk discharge line inlets 20, 21 and a single milk discharge outlet 23. Thus it can be understood that during the milking process, milk is received from milk discharge lines L1–L4, discharged to the respective milk receiving manifold sections M1–M2, and thereafter discharged through the single milk discharge outlet 23 of each milk receiving manifold section to a conventional Y-fitting (not shown).

Referring to FIG. 2, an expanded view of milk receiving manifold sections M1–M2 is illustrated. These respective sections are connected at their forward bottom portions by hinge H. The functionality of hinge H is to impart two degrees of freedom to the respective movements of milk receiving manifold sections M1–M2 relative to one another about hinge H.

First, hinge H permits the respective milk receiving manifold sections M1–M2 to pivot towards and away from one another along vector 24; that is milk receiving manifold sections M1–M2 can increase their angularity with respect to one another by moving on hinge H to increase or decrease the spread between opposite sides of udder U shown in FIG. 1.

Second, and in the degree of motion described above, it is important to remember the circumstance of people attaching and detaching such teat cup assemblies A. Specifically, when teat cup assembly A is lifted for attachment to udder U, complete freedom of movement is not desirable. Specifically, milk receiving manifold sections M1–M2 would move apart completely relative to one another causing two teat cups C1–C2 to fall completely away from the remaining two teat cups C3–C4. As a consequence, installation of teat cup assembly A to udder U would be hampered.

This condition is alleviated by placement of keeper chain 25. This keeper chain 25 causes limited motion of the respective milk receiving manifold sections M1–M2 relative to one another during handling of the system as a whole.

Thirdly, hinge H permits the respective milk receiving manifold sections M1–M2 to rotate relative to one another along vectors 26; that is milk receiving manifold sections M1–M2 can rotate with respect to one another by moving on hinge H to increase or decrease the relative angularity between opposite sides of udder U as shown in FIG. 1.

Returning to FIG. 1, the utility of the degrees of motion can immediately be understood.

First, the whole assembly is light enough so that it can be supported by the vacuum of four teat cups C1–C4.

Second, and assuming that the angularity of four teat cups C1–C4 changes with respect to udder U during milking, the hose connections from each of the four teat cups C1–C4 can easily accommodate the changing angularity.

Third, and where one of the two teat cups C1–C2 is higher than the other, milk receiving manifold section M1 will rotate to accommodate such imbalance. Similarly, and where one of the two teat cups C3–C4 is higher that the other, milk receiving manifold section M2 will rotate to accommodate such imbalance. All such relative rotations will occur on hinge H as limited only by keeper chain 25. This causes the weight to be relatively evenly distributed between the individual four teat cups C1–C4.

Thus the reader will understand that a simplified teat cup assembly is disclosed which attaches to the udder.

What is claimed is:

1. In a teat cup assembly for the udder of a dairy animal having four teats, the teat cup assembly comprising in combination:

four teat cups, each teat cup having a milk discharge line for discharging milk received to the teat cup to a milk receiving manifold;

a first milk receiving manifold section for receiving the milk discharge line from two of the four teat cups, the first milk receiving manifold section having respective first and second inlets for attaching to the milk discharge line of first and second respective teat cups and an outlet for discharging collected milk from the first milk receiving manifold section;

a second milk receiving manifold section for receiving the milk discharge line from two of the four teat cups, the second milk receiving manifold section having respective first and second inlets for attaching to the milk discharge line of third and fourth respective teat cups and an outlet for discharging collected milk from the second milk receiving manifold section;

means for attaching the first milk receiving manifold section to the second milk receiving manifold section to permit towards and away hinged movements between the first manifold section and the second manifold section and relative rotation between the first manifold section and the second manifold section.

2. In a teat cup assembly for the udder of a dairy animal according to claim 1 and wherein:

the means for attaching the first milk receiving manifold section to the second milk receiving manifold section includes a restraining member for inhibiting movement of the milk receiving manifold section towards and away from one another beyond a predetermined limit.

\* \* \* \* \*